United States Patent [19]

Waigand

[11] 4,430,578
[45] Feb. 7, 1984

[54] DEVICE FOR THE INPUT OF ADJUSTMENT VALUES IN ELECTRONIC SWITCHING SYSTEMS

[75] Inventor: Helmut Waigand, St. Georgen, Fed. Rep. of Germany

[73] Assignee: Bosch-Siemens Hausgeräte GmbH, Stuttgart, Fed. Rep. of Germany

[21] Appl. No.: 311,432

[22] Filed: Oct. 14, 1981

[30] Foreign Application Priority Data

Oct. 17, 1980 [DE] Fed. Rep. of Germany ....... 3039302

[51] Int. Cl.$^3$ .................... H01H 1/24; H01H 47/00
[52] U.S. Cl. ..................................... 307/115; 368/186
[58] Field of Search .............. 364/566, 569; 368/185, 368/186, 187; 307/112, 115

[56] References Cited
U.S. PATENT DOCUMENTS 4,209,975  7/1980  Moritani et al. .................... 368/186
4,258,354  3/1981  Carmon et al. ....................... 368/10
4,300,204  11/1981  Meada et al. ......................... 368/10

Primary Examiner—E A. Goldberg
Assistant Examiner—Derek S. Jennings
Attorney, Agent, or Firm—Herbert L. Lerner; Laurence A. Greenberg

[57] ABSTRACT

Multistage switching device for the input of adjustment values in electronic switching systems, including a counter circuit having counting stage inputs for counting orders of magnitude and oppositely counting directional inputs, an input switching part being movable into a plurality of adjustment positions, a plurality of contact points each being disposed at one of the adjustment positions and being connected to one of the counting stage inputs, and a changeover contact device of the input switching part being connected to the oppositely counting directional inputs.

5 Claims, 5 Drawing Figures

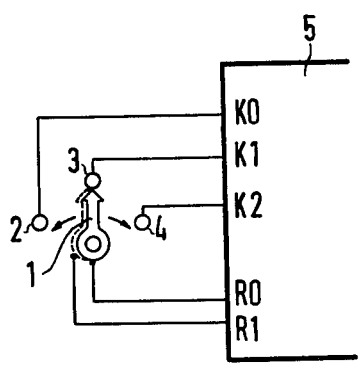
FIG. 1
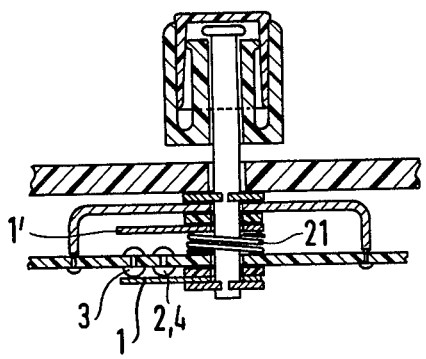
FIG. 2
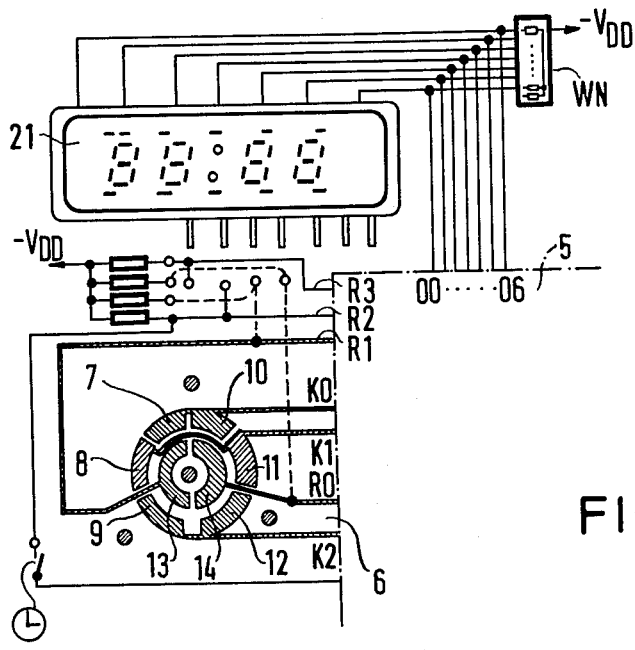
FIG. 3
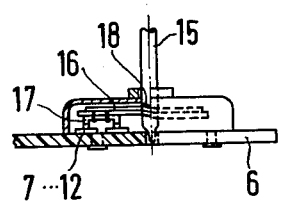
FIG. 4
FIG. 5

DEVICE FOR THE INPUT OF ADJUSTMENT VALUES IN ELECTRONIC SWITCHING SYSTEMS

The invention relates to a device for the input of adjustment values in electronic switching systems with multi-stage switching means.

By using arrangements such as these in electronic switching systems, a wide range of applications is feasible. In particular, input arrangements such as these can serve for the input of rated-value or setpoint variables for the control of preset operating sequences or cycles. In the domestic appliance field, rated values such as these can not only be target values for temperature or specific quantity data, but can especially be time data as well. Particularly with preset time data, the fact must be taken into account that both extremely long time intervals and a high timing precision are to be obtained. With known time presetting arrangements for the setting of hours, minutes, and seconds, a setting element is therefore provided for each, wherein upon its actuation the applicable time value is continued to be counted on an ascending scale. Normally no provision is made for an overrun to the next higher time rate; this to avoid any excessive prolongation of the set cycle when exceeding the desired setting value. It is also a known procedure to utilize a multi-stage switch, wherein each setting step is associated with a counting order of magnitude, such as specified time dimension. In this known case as well, each order of magnitude step is continued to be counted on a cyclically ascending scale without having the various order of magnitude steps employed produce a mutually detrimental effect on each other for the aforementioned reasons.

Building on this state of the art, it is accordingly an object of the invention to provide a device for the input of adjustment values in electronic switching systems, which overcomes the hereinafter-mentioned disadvantages of the heretofore-known devices of this general type, and by means of which it is feasible to electronically input plottable set points on one hand, even at highly-rated speeds, and on the other hand to do so with a high degree of precision.

With the foregoing and other objects in view there is provided, in accordance with the invention, a multi-stage switching device for the input of adjustment values in electronic switching systems, comprising a counter circuit having counting stage inputs for counting orders of magnitude and oppositely counting directional inputs, an input switching part being movable into a plurality of adjustment positions, a plurality of contact points each being disposed at one of the adjustment positions and being connected to one of the counting stage inputs, and a changeover contact device of the input switching part being connected to the oppositely counting directional inputs.

An arrangement equipped with these features according to the invention can be used for controlling various counting stages of a counter circuit by means of a single switching part, i.e., which only needs to be actuated by one hand, so that on one hand various speed and precision settings can be obtained therewith, and on the other hand the input switching part can be used for reversing the control of the counter circuit counting direction. This eliminates any problem involved in the counter circuit counting stage of having a feedback effect on each other on any applicable overrun. The rated value can be controlled with maximal speed at respectively high setting amounts without producing a detrimental effect upon exceeding this rated value. In this case the input of setting amounts by using the arrangement according to the invention is also possible, namely in a descending counting direction.

The arrangement according to the invention is especially suitable for the input of clock times. In this case three setting positions, namely one each for hours, minutes, and seconds, are required. All input values can be put in an ascending and in a descending counting direction, so that by comparison with known input procedural arrangements, the input procedure can be substantially simplified and shortened.

In accordance with another feature of the invention, the adjustment positions are adjustably disposed in axial or rotary direction and the changeover contact device is adjustably disposed in axial direction of the switching part.

Thus by way of a rotary-directional positioning, the value setting speed can be selected regardless of any increase or decrease in the setting amount, while an upper axial position of the switching part activates the output-connected counter circuit in an ascending counting direction, and the lower axial position of the switching part activates the output-connected counter circuit in a descending counting direction.

In accordance with a further feature of the invention, the input switching part is rotatable, the plurality of adjustment positions includes a middle position and commonly functioning contact pairs of adjustment positions each being disposed at a given distance from the middle position for one of the counting stage inputs, and the contact points are in the form of an equal plurality of contact points disposed on two opposite sides of the middle position at the given distances from the middle position along a first circular path, and additional contact points of the changeover device opposing the input switching part, being disposed along a second circular path being concentric to the first circular path and each being contactable by one of the first-mentioned contact points for determining the counting direction of the counter circuit. The switching part is therefore settable in a rotary direction on both sides of this central position. With this preferable embodiment of the arrangement according to the invention, the same amount of contact points is disposed bilaterally to a central position on the first circular path of an input switching part being settable in a rotary direction, the mirror-inverted opposite contact points being interconnected to a contact pair, which in this manner controls an assigned counting stage of the counter circuit. Both contact points are disposed bilaterally to the central position on the second circular path, to serve the counting-direction determination or sensing of the counter circuit. Thus, by means of the timing direction departing from the central position, the counter circuit counting direction is derived, while the timing amount from the central position determines criteria for the respective counter circuit counting stage to be controlled.

In accordance with an added feature of the invention, there is provided a reset spring for returning the input switching part to the middle position. In this way the switching part normally assumes the initial position, from which the setting action can be executed.

In accordance with a concomitant feature of the invention, there is provided a controlled microprocessor circuit connected to the counter circuit.

Other features which are considered as characteristic for the invention are set forth in the appended claims.

Although the invention is illustrated and described herein as embodied in a device for the input of adjustment values in electronic switching systems, it is nevertheless not intended to be limited to the details shown, since various modifications and strctural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic and schematic block circuit diagram of an extremely simplified input switching part in conjunction with a microprocessor control circuit;

FIG. 2 is a fragmentary, diagrammatic, partially cross-sectional view of the input switching part;

FIG. 3 is a diagrammatic and schematic circuit diagram of a further input switching system in conjunction with a microprocessor control and display unit;

FIG. 4 is a fragmentary partially cross-sectional view of the input switching part; and FIG. 5 is an elevational view of a contact disk disposed in the input switching part.

Referring now to the figures of the drawing and first particularly to FIG. 1 thereof, there is seen an input switching part having three contact points 2,3,4 disposed in the rotary path of a switch lever 1. Each of these level contact points is fed to one of the inputs K0, K1, K2 of a microprocessor control circuit 5. For simplification, a single-chip microprocessor (such as a model TMS 1070) can be used. With an appropriately organized microprocessor control circuit 5, the switch lever 1 sets hour values through the switch contact 2, minute values through the contact 3, and second values through the contact 4, and these values are then generated by microprocessor control means. Two further contact connections to the switching part are made from the outputs R0 and R1. These connections are made in such a way that on an elevated swivel plane of the switch lever 1, the output R0 of the microprocessor control 5 is connected to one of the contact points 2,3, or 4, while on a second (lower) swivel plane of the switch lever 1, the respective position of which is shown by a broken line, the output R1 of the microprocessor control 5 is connected to one of the contact points 2,3, or 4. By means of this planar switchover of the switch lever 1, the counting direction of the counter action that is controlled by the microprocessor 5, is determined. If the output R0 of the microprocessor control 5 is switched through to one of the inputs K0,K1, or K2 through the switch lever 1, then a selection in an upward counting direction is made while a through-connection of the output R1 produces a backward count.

On the setting knob of the switch level 1 or on an input level plate of the switch lever 1, non-illustrated setting symbols are attached.

According to FIG. 2, the input switching part is provided with two switch levers 1 and 1' which are able to swivel by means of a turning or control knob, the levers being set opposite to the contact points 2,3,4.

With the microprocessor circuit 5 connected, the switch lever 1 being under the load of a coil spring 21, bridges the output R0 with one of the inputs K0,K1,K2.

This bridging position releases a counting action in the microprocessor circuit with increasing or upward counting values. Any pressure exerted on the control knob working against the coil spring force drops the switch lever 1 off the area of the contact points 2,3,4, and instead the contact level 1' is dropped into the contact area. The contact lever 1' is assigned to the output R1 of the microprocessor circuit and accordingly to a counting action with backward counting values.

According to FIGS. 3 through 5, the input switching part is a rotary switch, which can depart from a respective central position and assume three setting positions. A circuit plate 6 is shown in FIG. 3 to have contact paths 7 through 12 on its circular path formed in the shape of six segments. Any two of these contact segments, namely the contact segments 7 and 10, 8 and 11, or 9 and 12, are interconnected and are commonly fed to the data inputs K0, K1, K2 of the microprocessor control 5. Concentrically disposed within the segments 7 through 12 are two segments 13, 14 intended for assignment to the data outputs R0 and R1 of the microprocessor control circuit 5.

It is seen from FIG. 4 that a shaft 15 has a contact disk 16 disposed thereon which in turn has a slide contact 17 that is torque-resistantly disposed thereunder. In this way the slide contact 17 can be shifted from a central or neutral position set between the contact segments 7 and 10 into one of the six contact setting positions. Therefore either the contact segment 13 is bridged by one of the contact segments 7,8,9 through the slider 17 or the bridging is made on an opposite-positional setting from the contact segment 14 to one of the contact segments 10,11,12.

As is true of the embodiment according to FIG. 1, when using a time indicator application of the arrangement each contact pair 7,10, 8,11 or 9,12, respectively, is assigned to a time dimension, namely seconds, minutes, or hours, while the contact segment 14 is assigned to an upward counting direction, and the contact segment 13 is assigned to a downward counting direction of the counter action being staged through the microprocessor 5.

A flat coil spring 18 is disposed on the shaft 15 of the input switching part for returning the contact disk 16 to the initial position thereof, upon a release of the shaft 15 following a setting action.

As is seen in FIG. 5, a guide groove 19 is machined into the contact disk 16 and a fixed stop pin 20 projects therein. By means of this stop, the swing setting angle of the contact disk 16 is limited.

Parallel data outputs 00 through 06 of the microprocessor control circuit 5 control a segmental indicator device 21, through which the respective input value can be read off and monitored. It is also seen from FIG. 3 that a voltage $V_{DD}$ is present at one end of a resistor network that is in turn selectively coupled to outputs R1, R2 and R3, and it is also present at the resistor network WN connected to the data outputs 00 through 06 and the indicator device 21.

There are claimed:

1. Multistage switching device for the input of adjustment values in electronic switching systems, comprising a counter circuit having counting stage inputs for counting orders of magnitude and oppositely counting directional inputs, an input switching part being movable into a plurality of adjustment positions, a plurality of contact points each being disposed at one of said adjustment positions and being connected to one of said counting stage inputs, and a changeover contact device of said input switching part being connected to said oppositely counting directional inputs, the counting magnitude and the counting direction of said counter circuit being switched to predetermined settings by moving said input switching part in any direction and at any speed into said adjustment positions.

2. Multistage switching device according to claim 1, wherein said adjustment positions and said changeover contact device are adjustably disposed in axial direction of said switching part.

3. Multistage switching device according to claim 1, wherein said input switching part is rotatable, said plurality of adjustment positions includes a middle position and commonly functioning contact pairs of adjustment positions each being disposed at a given distance from said middle position for one of said counting stage inputs, and said contact points are in the form of an equal plurality of contact points disposed on two opposite sides of said middle position at said given distances from said middle position along a first circular path, and additional contact points of said changeover device being disposed along a second circular path being concentric to said first circular path and each being contactable by one of said first-mentioned contact points for determining the counting direction of said counter circuit.

4. Multistage switching device according to claim 3, including a reset spring for returning said input switching part to said middle position.

5. Multistage switching device according to claim 1,2,3 or 4, including a controlled microprocessor circuit connected to said counter circuit.

* * * * *